Oct. 28, 1930.  W. S. PRITCHARD  1,780,096

WINDSHIELD

Filed Aug. 18, 1926  2 Sheets-Sheet 1

INVENTOR.
WILLIAM S. PRITCHARD
BY Whittemore Hulbert
Whittemore & Belknap
ATTORNEYS Patented Oct. 28, 1930

1,780,096

UNITED STATES PATENT OFFICE

WILLIAM S. PRITCHARD, OF DETROIT, MICHIGAN, ASSIGNOR TO MOTOR PRODUCTS CORPORATION, OF DETROIT, MICHIGAN, A CORPORATION OF NEW YORK

WINDSHIELD

Application filed August 18, 1926. Serial No. 130,031.

This invention relates to windshields and more particularly to improvements in the operating mechanism and mounting therefor.

The invention relates first to improvements in the operating mechanism for swinging windshields mounted adjacent the upper edge thereof upon horizontally disposed pivots and has particular reference to a mechanism of this character which is self-locking, shock absorbing, and involves a unitary control. Another predominant feature is the adjustable pivots whereby the assembling of the windshield and vehicle frame is facilitated.

Heretofore it has been practically universally customary in windshields of this character to provide an operating mechanism including a pair of sectors or arms arranged at the side of the windshield for moving and holding the same in its several positions of adjustment. In addition to being difficult to manipulate and otherwise relatively inefficient these heretofore known types of windshield operating mechanism afforded such a rigid support for the windshield that frequently the latter was broken or cracked owing to the fact that shocks and jars occasioned to the windshield while the motor vehicle was in transit were not absorbed or dissipated.

Difficulty has also been experienced with heretofore known types of windshield mechanism and particularly to such mechanism which involved operating gearing because the parts thereof and particularly the gears rattled due to the loose fit resulting from wear occasioned to the parts or from inaccurate machining. In the present day development of the automobile industry, equipment which is not rattle-proof, even after the wear occasioned by continued service, does not meet with universal favor in the industry as it is not commercially acceptable. Therefore the above objections to many of the heretofore known types of windshield mechanism have rendered the same relatively inefficient and unsatisfactory commercially.

The present invention has therefore among its objects, first to provide a windshield operating mechanism which will automatically compensate for wear occasioned to the parts during service; second to provide a simple and efficient self-locking and unitary control mechanism; third to provide a mechanism of this character constructed to absorb or dissipate shocks and jars occasioned to the windshield directly or transmitted thereto from the motor vehicle; and fourth to provide a construction wherein the mounting of the windshield is facilitated.

The invention also has among its objects, to simplify, render more efficient, and improve generally devices of this character and consists in the novel arrangement and combination of parts all of which will be made more apparent as this description proceeds, especially when considered in connection with the accompanying drawings wherein—

Figure 1:
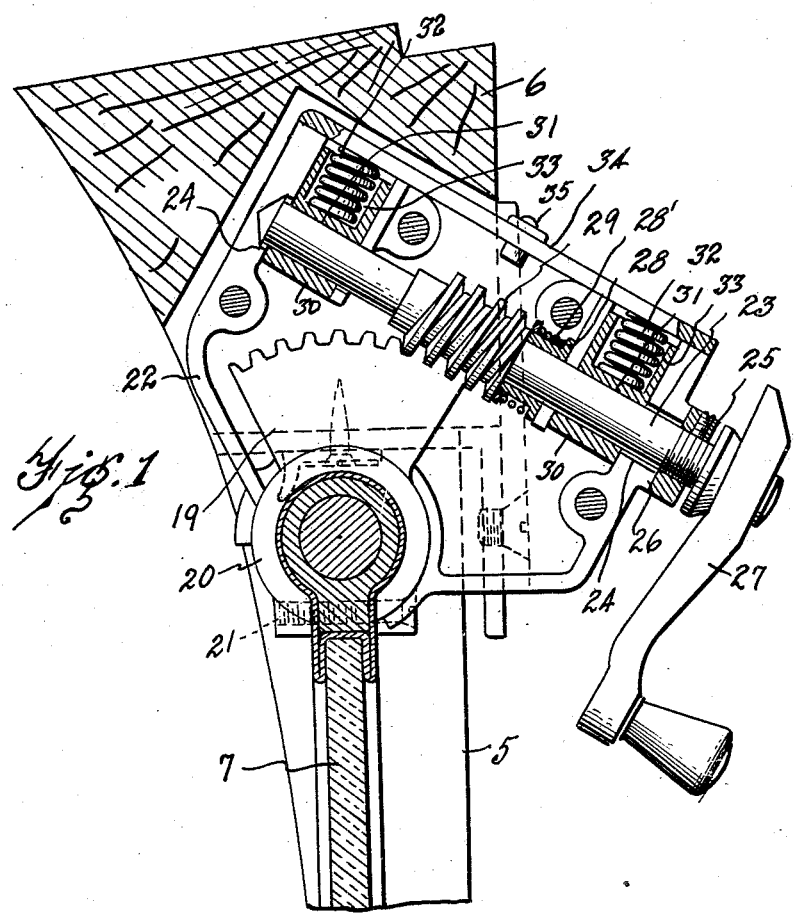
Figure 1 is a fragmentary sectional view through a windshield and the operating mechanism therefor.
Figure 4:
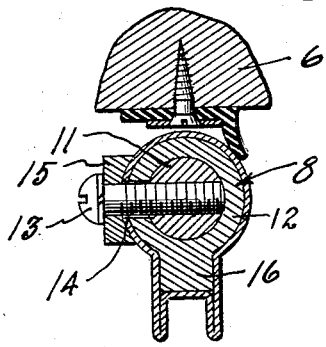
Figure 4 is a fragmentary sectional view taken substantially on the plane indicated by line 4—4 in Figure 2.
Figure 2:
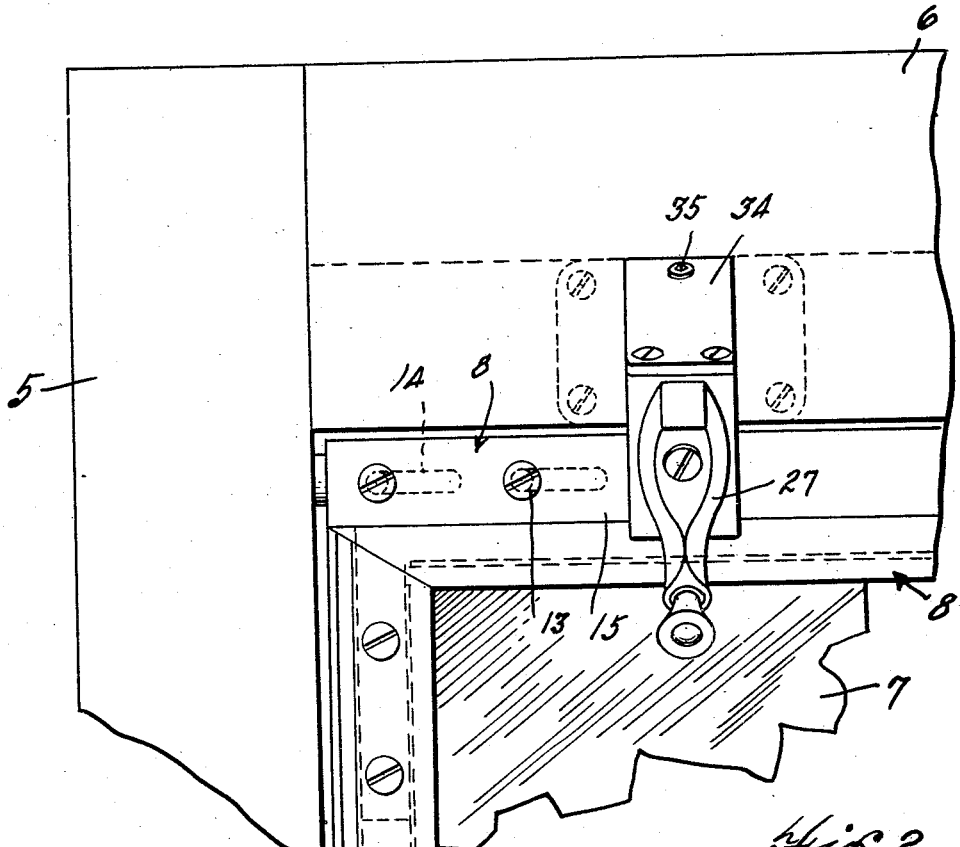
Figure 2 is a fragmentary elevational view of one side of the windshield, viewed from the interior of the vehicle.
Figure 3:
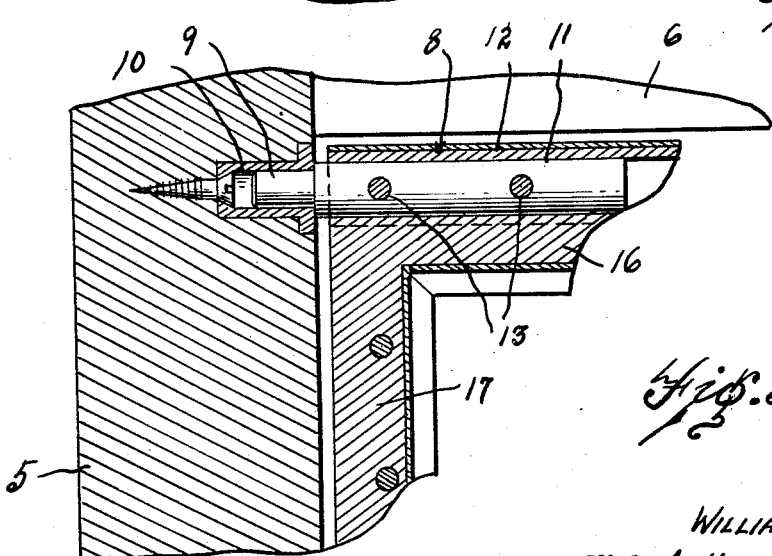
Figure 3 is an enlarged fragmentary sectional elevational view of one of the pivots.

Referring now particularly to the drawings wherein like reference characters indicate like parts it will be noted that there is illustrated a side frame member 5 and header 6 of a motor vehicle together with a windshield 7 and frame 8.

The windshield is pivotally mounted on the side frame members 5 by means of pivot pins 9 which project into the pivot recesses 10 formed in the frame members 5. Each pivot pin is carried by means of a plug 11 telescoping within a windshield corner bracket 12. The plug is secured in position by means of screws 13, threaded therein and engaging elongated slots 14 formed in the bracket 12 and windshield frame 8. A clamping plate 15 is provided suitably apertured to receive the screws 13, this plate overlying the slots in the frame to conceal the same and reinforce the frame. Each bracket 12 is also formed with a downwardly extending rib or part 16 and a right-angularly arranged part 17 which lie within the frame 8 of the windshield and constitute a corner brace therefor. This reinforces the corners and exerts the efforts of the operating mechanism at points on the sides of the windshield spaced from the top. By means of the adjustable pivot construction the windshield may be first so positioned with respect to the windshield opening that the pivot pins 9 are in registration with the pivot recesses 10 whereupon the pins 9 may be projected laterally into engagement with the recesses 10 and held in this position by tightening the screws 13. This facilitates the assembling of the windshield with the frame of the vehicle.

The windshield operating mechanism includes a worm gearing sector 19 provided with a bracket portion 20 by means of which the same is rigidly secured to the upper frame of the windshield by means of bolts 21. Mounted upon the header 6 is a housing 22 within which a worm shaft 23 is arranged, this shaft engaging loosely in openings 24 formed in the walls of the housing 22. The shaft 23 extends beyond the wall of the housing 22 at one end thereof and is threaded to receive a nut 25 which bears against a boss 26 formed on the said wall. This end of the shaft also has attached thereto an operating handle 27. Secured to this shaft is a worm 29 which meshes with the worm gear sector 19 carried by the upper edge of the windshield. A sleeve 28 slidably mounted on the shaft is engaged, through a collar formed thereon, by a spring 28' the other end of this spring engaging a suitable washer slidably mounted upon said sleeve and abutting the worm 29. The collared end of the sleeve abuts a fixed part of the housing and this sleeve and spring together with the nut 25 prevent axial movement of the shaft 23 and take up end thrusts imparted thereto. The spring and sleeve will compensate for wear or play in the parts.

Slidably mounted within the housing 22 is a pair of bearing elements 30 each formed with a transversely extending passage 31 constituting a bearing for the shaft 23. These elements 30 are normally urged in one direction by means of springs 32 arranged in wells or recesses 33 formed in the said bearing elements. The other end of each spring 32 bears against a cover 34 of the housing 22. The tendency of these springs is to urge the bearing elements 30 in the direction of the segment 19 so as to urge the shaft 23 and consequently the worm 29 carried thereby into engagement with the teeth of the worm gear sector 19. If desired the cover 34 may be provided with an oiling aperture 35 whereby oil may be supplied to the worm 29 and as a consequence to the teeth of the worm gear sector 19. The bearing elements 30 are preferably formed of graphite impregnated bronze and as a consequence need no lubrication.

As a consequence of the construction just described it will be readily apparent that the worm 29 is resiliently held in engagement with the worm gear sector 19 so that any wear occasioned to the parts in service will be compensated for and a rattling of the parts prevented. Furthermore it is proposed to form the tooth faces with an angle just within the limiting angle of friction which in this case is approximately fifteen degrees (15°) so that jars and shocks imparted to the windshield, and which as a consequence impart thrusts upon the sector which tend to cause a separation of the sector and worm, will be resiliently resisted by the spring 32 whereupon such shocks are absorbed or at least dissipated sufficient to prevent them from proving disastrous to the windshield. In addition to the advantages just enumerated it will also be apparent that the herein described construction provides a self-locking operating mechanism whereby the windshield will be held in any of its positions of adjustment and further a mechanism having a unitary control. Moreover the advantages of a swinging windshield provided with horizontal pivots are obtained but the difficulties heretofore experienced in assembling are eliminated by the provision of the adjustable pivots.

While the illustrative embodiment of the invention which has been shown and described herein in detail has been found in practice to render entirely satisfactory and efficient results nevertheless it should be understood that various changes may be made in many of the essential and all of the non-essential details of the invention as may be found necessary or expedient and to this end reservation is made to make such changes as may come within the purview of the accompanying claims.

What I claim as my invention is:

1. In a windshield construction, a windshield including a frame, supports therefor formed with pivot recesses, corner brackets secured to said frame at the corners thereof, plugs carrying pivot pins telescoping within said brackets and means for adjustably securing said plugs to said brackets whereby said pivot pins may be withdrawn to a position within the edges of said windshield frame to permit the positioning of the windshield between said supports and then projected to engage said pivot pins in said pivot recesses.

2. In a windshield construction particularly adapted for vehicles of the closed car type, the combination with a pair of fixed spaced pillars provided with pivot recesses in the opposed faces thereof, of a windshield having a frame adapted to be positioned between said pillars and pivotally mounted thereon, a pivot element slidably mounted in said windshield frame and adapted to be retracted to a position within the edge thereof to permit the positioning of the windshield between said pillars and means for projecting said pivot element into the corresponding pivot recess and for securing the same in its projected position.

In testimony whereof I affix my signature.

WILLIAM S. PRITCHARD.